United States Patent
Kokernak et al.

(10) Patent No.: US 8,051,455 B2
(45) Date of Patent: Nov. 1, 2011

(54) SYSTEMS AND METHODS FOR PROVIDING A TOKEN REGISTRY AND ENCODER

(75) Inventors: Michael Kokernak, Boston, MA (US); Madeleine Noland, Quincy, MA (US)

(73) Assignee: Backchannelmedia Inc., Boston, MA (US)

( * ) Notice: Subject to any disclaimer, the term of this patent is extended or adjusted under 35 U.S.C. 154(b) by 814 days.

(21) Appl. No.: 12/001,633

(22) Filed: Dec. 12, 2007

(65) Prior Publication Data

US 2009/0158316 A1 Jun. 18, 2009

(51) Int. Cl.
*H04N 7/173* (2011.01)
*H04N 7/10* (2006.01)
*H04N 7/025* (2006.01)

(52) U.S. Cl. ............... 725/113; 725/32; 725/36

(58) Field of Classification Search ........... None
See application file for complete search history.

(56) References Cited

U.S. PATENT DOCUMENTS

| | | | |
|---|---|---|---|
| 5,809,143 A | 9/1998 | Hughes | |
| 5,835,740 A | 11/1998 | Wise et al. | |
| 5,842,033 A | 11/1998 | Wise et al. | |
| 5,878,273 A | 3/1999 | Wise et al. | |
| 5,948,040 A | 9/1999 | DeLorme et al. | |
| 5,956,519 A | 9/1999 | Wise et al. | |
| 6,018,776 A | 1/2000 | Wise et al. | |
| 6,026,376 A * | 2/2000 | Kenney | 705/27 |
| 6,035,126 A | 3/2000 | Wise et al. | |
| 6,039,688 A | 3/2000 | Douglas et al. | |
| 6,047,112 A | 4/2000 | Wise et al. | |
| 6,067,417 A | 5/2000 | Wise et al. | |
| 6,134,318 A | 10/2000 | O'Neil | |
| 6,256,785 B1 * | 7/2001 | Klappert et al. | 725/136 |
| 6,263,422 B1 | 7/2001 | Wise et al. | |
| 6,270,011 B1 | 8/2001 | Gottfried | |
| 6,272,176 B1 | 8/2001 | Srinivasan | |
| 6,327,619 B1 | 12/2001 | Blumenau | |
| 6,330,665 B1 | 12/2001 | Wise et al. | |
| 6,338,043 B1 | 1/2002 | Miller | |
| 6,360,206 B1 | 3/2002 | Yamashita | |
| 6,385,596 B1 | 5/2002 | Wiser et al. | |
| 6,418,470 B2 | 7/2002 | Blumenau | |

(Continued)

FOREIGN PATENT DOCUMENTS

WO WO-9966381 12/1999

(Continued)

OTHER PUBLICATIONS

International Search Report dated Feb. 4, 2009 in International Application No. PCT/US08/13292.

(Continued)

*Primary Examiner* — Brian Pendleton
*Assistant Examiner* — Ryan Stronczer
(74) *Attorney, Agent, or Firm* — Mintz, Levin, Cohn, Ferris, Glovsky & Popeo PC

(57) ABSTRACT

Systems and methods for using tokens to link the television and the Internet platforms. The tokens are tightly encoded into the content and a registry controls the linking of the television content to specific Internet-based content. The registry also polices the validity of the tokens and optionally provides the token owner with continued control over the Internet content associated with that token. When the two platforms are linked successfully, the consumer receives quality content, while being protected from unwanted Internet content.

16 Claims, 5 Drawing Sheets

U.S. PATENT DOCUMENTS

| | | |
|---|---|---|
| 6,434,621 B1 | 8/2002 | Pezzillo et al. |
| 6,438,751 B1* | 8/2002 | Voyticky et al. ............... 725/42 |
| 6,460,079 B1 | 10/2002 | Blumenau |
| 6,463,466 B1 | 10/2002 | Weyer |
| 6,507,727 B1 | 1/2003 | Henrick |
| 6,543,052 B1 | 4/2003 | Ogasawara |
| 6,546,413 B1 | 4/2003 | Northrup |
| 6,615,185 B1 | 9/2003 | Bernstein |
| 6,711,256 B1 | 3/2004 | O'Neil |
| 6,718,553 B2* | 4/2004 | Kenworthy ............... 725/118 |
| 6,758,391 B1 | 7/2004 | Pickens, III |
| 6,760,916 B2 | 7/2004 | Holtz et al. |
| 6,769,127 B1 | 7/2004 | Bonomi et al. |
| 6,847,936 B2 | 1/2005 | Fang |
| 6,868,403 B1 | 3/2005 | Wiser et al. |
| 6,901,436 B1 | 5/2005 | Schneider |
| 6,901,606 B2 | 5/2005 | Wright et al. |
| 6,918,113 B2 | 7/2005 | Patel et al. |
| 6,925,458 B2 | 8/2005 | Scaturro et al. |
| 6,937,996 B1 | 8/2005 | Forsythe et al. |
| 6,938,015 B2 | 8/2005 | Joshi et al. |
| 6,957,041 B2 | 10/2005 | Christensen et al. |
| 6,963,898 B2 | 11/2005 | Yoshimine et al. |
| 6,970,886 B1 | 11/2005 | Conwell et al. |
| 6,985,882 B1 | 1/2006 | Del Sesto |
| 7,003,500 B1 | 2/2006 | Driessen |
| 7,051,029 B1 | 5/2006 | Fayyad et al. |
| 7,065,497 B1 | 6/2006 | Brewster et al. |
| 7,065,557 B2 | 6/2006 | Sowden et al. |
| 7,103,557 B2 | 9/2006 | Middeljans et al. |
| 7,103,908 B2 | 9/2006 | Tomsen |
| 7,200,868 B2 | 4/2007 | Mattox et al. |
| 7,222,363 B2 | 5/2007 | Rice et al. |
| 7,240,365 B2 | 7/2007 | de Jong et al. |
| 7,275,156 B2 | 9/2007 | Balfanz et al. |
| 7,299,292 B2 | 11/2007 | Morten et al. |
| 7,444,659 B2* | 10/2008 | Lemmons ............... 725/34 |
| 2001/0003099 A1 | 6/2001 | Von Hohorn |
| 2001/0014868 A1 | 8/2001 | Herz et al. |
| 2001/0025255 A1 | 9/2001 | Gaudian |
| 2001/0029478 A1 | 10/2001 | Laster et al. |
| 2001/0034219 A1 | 10/2001 | Hewitt et al. |
| 2001/0037314 A1 | 11/2001 | Ishikawa |
| 2001/0042010 A1 | 11/2001 | Hassell |
| 2001/0049617 A1 | 12/2001 | Berenson et al. |
| 2002/0010757 A1 | 1/2002 | Granik et al. |
| 2002/0013727 A1 | 1/2002 | Lee |
| 2002/0016848 A1 | 2/2002 | Yoshimine et al. |
| 2002/0026359 A1 | 2/2002 | Long et al. |
| 2002/0026420 A1 | 2/2002 | DuPhily |
| 2002/0032603 A1 | 3/2002 | Yeiser |
| 2002/0049037 A1 | 4/2002 | Christensen et al. |
| 2002/0053078 A1 | 5/2002 | Holtz et al. |
| 2002/0065034 A1 | 5/2002 | Zhang |
| 2002/0065715 A1 | 5/2002 | Tennyson et al. |
| 2002/0078033 A1 | 6/2002 | Scaturro et al. |
| 2002/0078446 A1 | 6/2002 | Dakss et al. |
| 2002/0083005 A1 | 6/2002 | Lowenstein et al. |
| 2002/0091544 A1 | 7/2002 | Middeljans et al. |
| 2002/0094868 A1 | 7/2002 | Tuck et al. |
| 2002/0095387 A1 | 7/2002 | Sosa et al. |
| 2002/0099564 A1 | 7/2002 | Kim et al. |
| 2002/0103675 A1 | 8/2002 | Vanelli |
| 2002/0104090 A1 | 8/2002 | Stettner |
| 2002/0104099 A1 | 8/2002 | Novak |
| 2002/0111865 A1 | 8/2002 | Middleton et al. |
| 2002/0112035 A1 | 8/2002 | Carey et al. |
| 2002/0123956 A1 | 9/2002 | Galuten |
| 2002/0129002 A1 | 9/2002 | Alberts et al. |
| 2002/0129359 A1 | 9/2002 | Lichner |
| 2002/0138364 A1 | 9/2002 | Katagiri et al. |
| 2002/0144262 A1* | 10/2002 | Plotnick et al. ............... 725/32 |
| 2002/0147645 A1 | 10/2002 | Alao et al. |
| 2002/0149559 A1 | 10/2002 | Sowden et al. |
| 2002/0151327 A1 | 10/2002 | Levitt |
| 2002/0156866 A1 | 10/2002 | Schneider |
| 2002/0162117 A1* | 10/2002 | Pearson et al. ............... 725/109 |
| 2002/0174425 A1 | 11/2002 | Markel et al. |
| 2002/0198786 A1 | 12/2002 | Tripp et al. |
| 2003/0003990 A1 | 1/2003 | Von Hohorn |
| 2003/0004787 A1 | 1/2003 | Tripp et al. |
| 2003/0004882 A1 | 1/2003 | Holler et al. |
| 2003/0028429 A1 | 2/2003 | Mittman et al. |
| 2003/0040838 A1 | 2/2003 | Lagunzad et al. |
| 2003/0046083 A1 | 3/2003 | Devinney, Jr. et al. |
| 2003/0052905 A1 | 3/2003 | Gordon et al. |
| 2003/0056210 A1 | 3/2003 | Joshi et al. |
| 2003/0060157 A1 | 3/2003 | Henrick |
| 2003/0083929 A1 | 5/2003 | Springer et al. |
| 2003/0101101 A1 | 5/2003 | Fang |
| 2003/0110080 A1 | 6/2003 | Tsutani et al. |
| 2003/0126275 A1 | 7/2003 | Mungavan et al. |
| 2003/0149781 A1 | 8/2003 | Yared et al. |
| 2003/0154142 A1 | 8/2003 | Ginsburg et al. |
| 2003/0159566 A1 | 8/2003 | Sater et al. |
| 2003/0164557 A1 | 9/2003 | Chung et al. |
| 2003/0172374 A1 | 9/2003 | Vinson et al. |
| 2003/0177101 A1 | 9/2003 | Ferris |
| 2003/0187953 A1 | 10/2003 | Pearson et al. |
| 2003/0195806 A1 | 10/2003 | Willman et al. |
| 2003/0195842 A1 | 10/2003 | Reece |
| 2003/0226141 A1 | 12/2003 | Krasnow et al. |
| 2003/0229536 A1 | 12/2003 | House et al. |
| 2003/0234819 A1 | 12/2003 | Daly et al. |
| 2004/0009858 A1 | 1/2004 | Tamaribuchi |
| 2004/0010806 A1 | 1/2004 | Yuen et al. |
| 2004/0015401 A1 | 1/2004 | Lee et al. |
| 2004/0044535 A1 | 3/2004 | Conner et al. |
| 2004/0046977 A1 | 3/2004 | Silverbrook et al. |
| 2004/0052377 A1 | 3/2004 | Mattox et al. |
| 2004/0054589 A1 | 3/2004 | Nicholas et al. |
| 2004/0054628 A1 | 3/2004 | de Jong et al. |
| 2004/0054629 A1 | 3/2004 | de Jong et al. |
| 2004/0054634 A1 | 3/2004 | Tak |
| 2004/0054750 A1 | 3/2004 | de Jong et al. |
| 2004/0054915 A1 | 3/2004 | Jong et al. |
| 2004/0059629 A1 | 3/2004 | Luo et al. |
| 2004/0059939 A1 | 3/2004 | de Jong |
| 2004/0062379 A1 | 4/2004 | O'Neil |
| 2004/0073688 A1 | 4/2004 | Sampson |
| 2004/0078604 A1 | 4/2004 | Rice et al. |
| 2004/0083133 A1 | 4/2004 | Nicholas et al. |
| 2004/0083215 A1 | 4/2004 | de Jong |
| 2004/0088328 A1 | 5/2004 | Cook et al. |
| 2004/0088420 A1 | 5/2004 | Allen et al. |
| 2004/0117248 A1 | 6/2004 | Dutta et al. |
| 2004/0117269 A1 | 6/2004 | Karaoguz et al. |
| 2004/0117303 A1 | 6/2004 | Gamboa |
| 2004/0117827 A1* | 6/2004 | Karaoguz et al. |
| 2004/0117838 A1* | 6/2004 | Karaoguz et al. |
| 2004/0117842 A1* | 6/2004 | Karaoguz et al. |
| 2004/0122735 A1* | 6/2004 | Meshkin |
| 2004/0128257 A1 | 7/2004 | Okamoto et al. |
| 2004/0128364 A1* | 7/2004 | Clark |
| 2004/0128516 A1 | 7/2004 | Okamoto et al. |
| 2004/0133518 A1* | 7/2004 | Dryall |
| 2004/0133782 A1 | 7/2004 | Sander et al. |
| 2004/0139156 A1* | 7/2004 | Matthews et al. |
| 2004/0139318 A1* | 7/2004 | Fiala et al. |
| 2004/0182940 A1* | 9/2004 | Biller |
| 2004/0204952 A1* | 10/2004 | Rochet |
| 2004/0221163 A1 | 11/2004 | Jorgensen et al. |
| 2004/0225386 A1 | 11/2004 | Thompson et al. |
| 2004/0230797 A1 | 11/2004 | Ofek et al. |
| 2004/0235567 A1* | 11/2004 | Chatani |
| 2004/0237100 A1 | 11/2004 | Pinder et al. |
| 2004/0249707 A1* | 12/2004 | Park |
| 2005/0010473 A1* | 1/2005 | McLaughlin |
| 2005/0010758 A1 | 1/2005 | Landrock et al. |
| 2005/0010957 A1* | 1/2005 | Muller et al. |
| 2005/0024689 A1 | 2/2005 | House et al. |
| 2005/0027598 A1* | 2/2005 | Greiner |
| 2005/0028200 A1* | 2/2005 | Sardera ............... 725/42 |
| 2005/0038702 A1* | 2/2005 | Merriman et al. |
| 2005/0038749 A1* | 2/2005 | Fitch et al. |
| 2005/0091107 A1* | 4/2005 | Blum |
| 2005/0111663 A1* | 5/2005 | Lotspiech et al. |

| | | | |
|---|---|---|---|
| 2005/0120125 A1 | 6/2005 | Morten et al. | |
| 2005/0131834 A1* | 6/2005 | Rodriguez et al. | |
| 2005/0138560 A1* | 6/2005 | Lee et al. | |
| 2005/0144020 A1* | 6/2005 | Muzaffar et al. | |
| 2005/0144126 A1* | 6/2005 | Commodore et al. | |
| 2005/0171897 A1* | 8/2005 | Forsythe et al. | |
| 2005/0182956 A1 | 8/2005 | Ginter et al. | |
| 2005/0185398 A1 | 8/2005 | Scannell | |
| 2005/0188853 A1 | 9/2005 | Scannell | |
| 2005/0204019 A1* | 9/2005 | Flynn et al. | |
| 2005/0229209 A1* | 10/2005 | Hildebolt et al. | |
| 2005/0230038 A1* | 10/2005 | Guckert et al. | |
| 2005/0234789 A1* | 10/2005 | Czyzewski et al. | |
| 2005/0239495 A1 | 10/2005 | Bayne | |
| 2005/0267805 A1* | 12/2005 | Tarantino | |
| 2005/0283791 A1* | 12/2005 | McCarthy et al. | |
| 2005/0289002 A1* | 12/2005 | Mathis | |
| 2005/0289630 A1* | 12/2005 | Andrews et al. | |
| 2006/0020523 A1* | 1/2006 | Song | |
| 2006/0020548 A1* | 1/2006 | Flather | |
| 2006/0031153 A1* | 2/2006 | Kim | |
| 2006/0031499 A1* | 2/2006 | Yoshimine et al. | |
| 2006/0031500 A1* | 2/2006 | Yoshimine et al. | |
| 2006/0031501 A1 | 2/2006 | Yoshimine et al. | |
| 2006/0031502 A1 | 2/2006 | Yoshimine et al. | |
| 2006/0036484 A1 | 2/2006 | Voticky | |
| 2006/0036742 A1 | 2/2006 | Yoshimine et al. | |
| 2006/0041480 A1 | 2/2006 | Briggs | |
| 2006/0053051 A1 | 3/2006 | Goodman | |
| 2006/0053067 A1 | 3/2006 | Driessen | |
| 2006/0059053 A1 | 3/2006 | Payne | |
| 2006/0068758 A1 | 3/2006 | Dharmadhikari et al. | |
| 2006/0069612 A1 | 3/2006 | Hurt et al. | |
| 2006/0080170 A1 | 4/2006 | Roach et al. | |
| 2006/0080172 A1 | 4/2006 | Najarian et al. | |
| 2006/0089843 A1 | 4/2006 | Flather | |
| 2006/0089875 A1 | 4/2006 | Park et al. | |
| 2006/0095337 A1 | 5/2006 | Morgan | |
| 2006/0101489 A1 | 5/2006 | Roden et al. | |
| 2006/0116924 A1 | 6/2006 | Angles et al. | |
| 2006/0123053 A1 | 6/2006 | Scannell | |
| 2006/0123449 A1 | 6/2006 | Ma et al. | |
| 2006/0129490 A1 | 6/2006 | Collar et al. | |
| 2006/0129502 A1 | 6/2006 | Pastusiak et al. | |
| 2006/0136335 A1 | 6/2006 | Ferguson | |
| 2006/0143084 A1 | 6/2006 | Donnelli et al. | |
| 2006/0148454 A1 | 7/2006 | Welch | |
| 2006/0154642 A1 | 7/2006 | Scannell | |
| 2006/0156409 A1 | 7/2006 | Chladek | |
| 2006/0190616 A1 | 8/2006 | Mayerhofer et al. | |
| 2006/0206912 A1 | 9/2006 | Klarfeld et al. | |
| 2006/0219776 A1 | 10/2006 | Finn | |
| 2006/0272022 A1 | 11/2006 | Loukianov et al. | |
| 2007/0016918 A1 | 1/2007 | Alcorn et al. | |
| 2007/0061838 A1* | 3/2007 | Grubbs et al. | 725/35 |
| 2007/0088812 A1 | 4/2007 | Clark | |
| 2007/0089137 A1 | 4/2007 | Clark | |
| 2007/0089157 A1 | 4/2007 | Clark | |
| 2007/0089158 A1 | 4/2007 | Clark | |
| 2007/0156611 A1 | 7/2007 | Gupta et al. | |
| 2007/0156890 A1 | 7/2007 | Promny | |
| 2007/0157251 A1 | 7/2007 | Shrivastava et al. | |
| 2007/0162967 A1 | 7/2007 | de Jong et al. | |
| 2007/0169189 A1 | 7/2007 | Crespo | |
| 2007/0198436 A1 | 8/2007 | Weiss | |
| 2007/0204044 A1 | 8/2007 | Rice et al. | |
| 2007/0241189 A1 | 10/2007 | Slavin et al. | |
| 2007/0250901 A1 | 10/2007 | McIntire et al. | |
| 2007/0288951 A1 | 12/2007 | Ray et al. | |
| 2007/0300273 A1* | 12/2007 | Turner | 725/105 |
| 2007/0300280 A1* | 12/2007 | Turner et al. | 725/135 |
| 2008/0006002 A1 | 1/2008 | Strickland et al. | |
| 2008/0046945 A1 | 2/2008 | Hanley | |
| 2008/0060002 A1 | 3/2008 | Noll et al. | |
| 2008/0114648 A1 | 5/2008 | Chen et al. | |
| 2008/0134043 A1 | 6/2008 | Georgis et al. | |
| 2008/0263581 A1* | 10/2008 | Turner | 725/22 |
| 2008/0288600 A1 | 11/2008 | Clark | |
| 2009/0019061 A1 | 1/2009 | Scannell, Jr. | |

FOREIGN PATENT DOCUMENTS

| | | |
|---|---|---|
| WO | WO-0116900 | 3/2001 |
| WO | WO-0127788 | 4/2001 |
| WO | WO-0133501 | 5/2001 |
| WO | WO-0150429 | 7/2001 |
| WO | WO-0213073 | 2/2002 |
| WO | WO-02052813 | 7/2002 |
| WO | WO-03015370 | 2/2003 |
| WO | WO-03025720 | 3/2003 |
| WO | WO-03093961 | 11/2003 |
| WO | WO-2004031899 | 4/2004 |
| WO | WO-2004038997 | 5/2004 |
| WO | WO-2004099940 | 11/2004 |
| WO | WO-2005001618 | 1/2005 |
| WO | WO-2006002238 | 1/2006 |
| WO | WO-2006014721 | 2/2006 |
| WO | WO-2006030410 | 3/2006 |
| WO | WO-2006039053 | 4/2006 |
| WO | WO-2006059140 | 6/2006 |
| WO | WO-2006073489 | 7/2006 |
| WO | WO-2006084278 | 8/2006 |
| WO | WO-2007046020 | 4/2007 |
| WO | WO-2007084851 | 7/2007 |
| WO | WO-2007125486 | 11/2007 |
| WO | WO-2007144852 | 12/2007 |
| WO | WO-2007145687 | 12/2007 |
| WO | WO-2008061184 | 5/2008 |
| WO | WO-2009075755 | 6/2009 |

OTHER PUBLICATIONS

"The Pearl by Nexnet", retrieved from the internet at http://www.thenexnet.com/ on May 28, 2009.

"Update TV® Technology Overview", UpdateLogic, Incorporated, <http://www.updatelogic.com/technology.html>, printed from the Internet Apr. 28, 2009.

International Search Report and Written Opinion dated Feb. 22, 2010 in International Application No. PCT/US2009/061648.

"Interactivity takes major step for broadcasters", BroadcastEngineering, http:/www.broadcastengineering.com/news/interactivity-major-step-broadcasters-08256/index.html, retrieved from the Internet on Feb. 8, 2010.

"Media Object Server (MOS) Protocol v2.6", http://www.mosprotocol.com/MOS%20Files/mosv26.htm, retrieved from the Internet on Feb. 8, 2010.

* cited by examiner

SYSTEMS AND METHODS FOR PROVIDING A TOKEN REGISTRY AND ENCODER

FIELD OF THE INVENTION

The systems and methods described herein generally pertain to the field of systems for tracking content for advertising and purchasing products and services.

BACKGROUND

The growth of the Internet has challenged the vitality and significance of television as a medium for advertising. The Internet provides content that attracts viewers, and at the same time provides a data processing platform that allows the viewer to instantly select content and agree to purchases. Consequently, a consumer watching content over the Internet can be presented with an advertisement carrying an interactive link that the user can select like any other web link. Based on that selection, the consumer can buy a product or at least request additional information about the product from the retailer. Many advertisers see this as a better platform. With the Internet, an advertiser can simultaneously present both an ad and a mechanism to purchase the product, reaching the consumer while the advertisement is their mind.

Consequently, the future of the television platform as an advertising medium will depend upon joining the television platform to the Internet platform. Many companies and groups are working on this issue and are developing technologies that allow for two way communications, including two-way communications over the cable-TV network. Cable Labs, Comcast and others are developing systems that will act as gateways between the cable TV network and the Internet.

Although these technologies may be successful at extending the communication structure of the Internet to the cable TV network, these technologies merely increase the bi-directional communication capabilities of the cable TV platform. However, it is unclear that merely adding improved communication technology will allow the television platform to compete successfully against Internet advertising systems. These systems will link the TV platform to the Internet, but by doing this they merely allow Internet-like advertising, such as linkable content, to be carried over the cable-TV platform. In essence, the proposed systems merely extend low quality Internet banner ads and pop-up ads to the TV viewing experience. Thus these proposed solutions fail to address the existing technologies and platforms for developing and distributing advertising content over the television network. Further, these technologies exist only in the cable television environment while advertisers desire a solution that operates in all television distribution environments. Television advertising is fundamentally different from Internet advertising which is based on targeted banner ads. Television advertising today, and for the foreseeable future, involves advertising agencies that develop high quality television content designed to engage the consumer. Significant time and expense is invested to create quality content that showcases and establishes a brand identity as well as the product.

For television systems to compete against the Internet, technology needs to be developed that extends the interactivity of the Internet to the TV medium, in a manner that fits with the existing structure of television advertising.

As such there remains a need for a system that provides an improved platform for allowing advertisers to interact with consumers through the medium of television.

SUMMARY OF THE INVENTION

The systems and methods described herein include, among other things, token registries that register unique tokens that may be encoded into a video, such as a television commercial encoded as an MPEG-2 file. The video file may be decoded by a decoder in a set-top box to display the content to a viewer. An application running on the set-top box detects a select command generated by the user and returns the token to the cable head and via the cable backchannel.

To this end, the systems provide a token registry that allows a content developer to purchase a token that provides a unique identifier for a piece of content. The token may be incorporated into the content created by the purchaser. The process by which the token is incorporated into the content ties the token to the content such that it cannot be used in any other content. Once the content is tagged with the token, the content is ready to be delivered over the cable network. In one practice, the tagged content is placed within a storage area for storing creative content. A media outlet that sells advertising space on shows broadcast nationally can sell television ad time slots to different advertisers and these slots can become spots into which the tagged content can be placed. Once the tagged content is placed within the media, the media outlet can play out the created content, such as a television show and the played out television show can be delivered to a viewing device, such as a set-top box. A set-top box will decode the played out content and display the decoded content to the user. The set-top box in some embodiments can check that the token and the content are a valid pair. Typically, the token integrated into the content will include data that triggers a visual display to the viewer over the television device connected to the set-top box. At the same time, a program operating on the set-top box will keep track of the token associated with the content being displayed to the viewer.

Typically, the visual content associated with the token will include an instruction or suggestion that can be followed by the viewer. For example, the token may include an instruction to "click OK" if the user wishes to purchase a certain product being displayed. When the user activates the select button on their remote control, the set-top box detects the incoming select signal and develops a data message to return over the backchannel. Additionally, the set-top box detects tokens when users do not activate the select button. The data message may include data that represents that the viewer simply saw the token-encoded content, and that the viewer activated the select button in such cases, and data that indicates the token that was carried with the content being displayed to the viewer at the time, and the data that uniquely identifies the particular set-top box. This information can be delivered to a data collector that is connected to a media manager which can take the token delivered across the backchannel and access the token registry. The token registry contains a list of all tokens authorized to be serviced on the television platform. In one embodiment, the token registry will compare the token data received over the backchannel to the list of registered tokens. If the token is not registered, the registry will reject the token. Optionally, the registry will determine the origin of the unregistered token and take corrective action. In one practice, the registry associates tokens with an Internet access instruction provided by the token owner and allowed by the registry, if the registry finds the token is valid. For example, the registry may allow the token owner to identify an approved web link that the registry will deliver to the viewer. In this particular embodiment, the media manager places the web link as an entry within a portal associated with the viewer. The portal is typically a website accessible by the viewer so that at a later time the viewer can access the portal to determine which products the viewer selected for later consideration.

Other objects of the invention will, in part, be obvious, and, in part, be shown from the following description of the systems and methods shown herein.

BRIEF DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATED EMBODIMENTS

Figure 1:
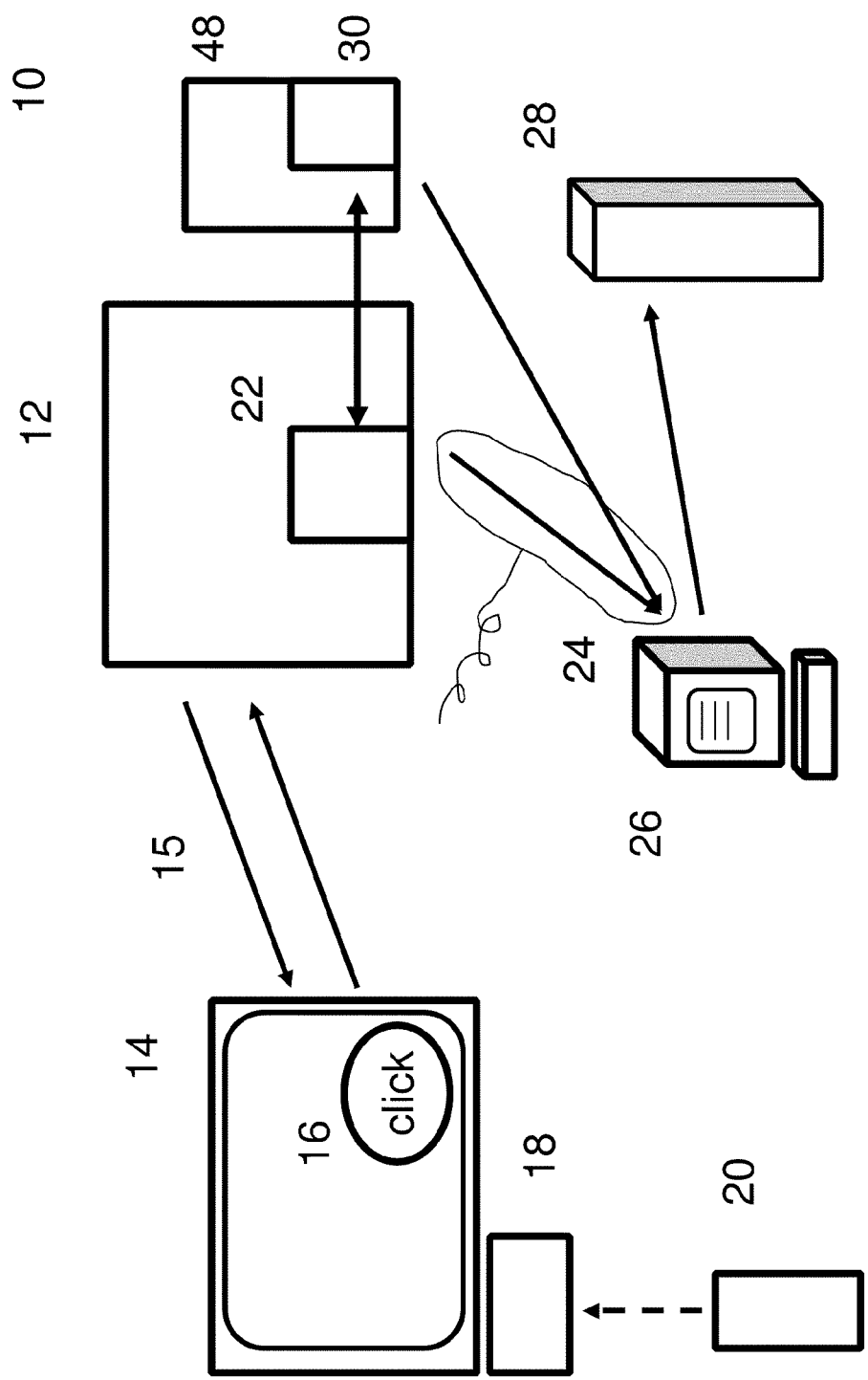
FIG. 1 depicts one embodiment of a system according to the invention.

To provide an overall understanding of the invention, certain illustrative embodiments will now be described, including a system that allows for registering tokens that may be incorporated into a video file and delivered over a cable television network. The registry systems allow an ad agency, for example, to collect or purchase a token that is unique to other tokens used on the cable TV network. The tokens can be incorporated into video advertisements developed by the ad agency at the time the ad agency creates the content. In another alternative practice, the token can be incorporated later in the process such as immediately before play out at a television station. Although the tokens may be encoded into any content, one particular type of content is a television commercial of the type used in a national television ad campaign. The registry registers the token with the system and allows the token owner to associate, via the token, the television commercial with one or more Internet site links. When a viewer views or responds to an ad that contains a token, the viewer's set top box will generate a data packet containing the token, or at least part of the token, and that data packet gets transferred back to the cable head end and on to a media manager system wherein the token registry is accessed. At the media manager, the registry will review the token to determine whether the token is valid and registered on the system. Once confirmed as valid, the registry will place into a consumer portal the link to the Internet site that the token owner associated with the token. Optionally, the registry may include a further step of contacting the token owner to verify that the correct Internet link is registered with the link before placing the token into the consumer portal.

Thus the registered tokens link the television and the Internet platforms as the tokens are tightly encoded into the advertiser's content and the registry controls the linking of the advertiser's content to specific Internet-based content. The registry also polices the validity of the tokens and optionally provides the token owner with continued control over the Internet content associated with that token. Additionally, the advertiser is protected from click fraud because each click that activates the link will need to be processed through the registry and optionally through the consumer's own preferences settings, thus ensuring that the consumer only receives messages they have requested. When the two platforms are linked successfully, the consumer receives quality advertising content, while being protected from phishing and spam.

However, the systems and methods described above and set out in detail below are merely embodiments to illustrate the invention and these embodiments and other embodiments are not limiting and may be adapted and modified for other applications and such other additions and modifications will not depart from the scope of the invention. For example, each moment of television content, whether advertising or non-commercial programming, may have an embedded token. As consumers watch television they use their remote control to indicate interest in the web experience that the content owner has linked to that moment in the television program through the embedded token. Thus the systems described herein may be for educational, commercial, governmental or other use. In addition the television content could be delivered through a cable network as described above or by other means such as direct broadcast satellite, over-the-air reception, fiber optic networks and other television distribution systems.

The token registry system described herein may be employed with many different types of media and content delivery platforms, but as noted above one particular and illustrative example is the use of the token registry to provide content that can be tracked over a cable TV network. FIG. 1 depicts such a cable television system that allows for interactive advertising. These kinds of systems are described in more detail in U.S. patent application Ser. No. 11/650,007 the contents of which are incorporated herein by reference. The token registry described herein provides a centralized registry of tokens that can be purchased or otherwise obtained, and incorporated into content that is delivered over the system depicted in FIG. 1.

In particular, FIG. 1 depicts an interactive cable television system that allows a viewer to respond to content displayed on the television. The content being displayed can be tracked as the content is delivered across the cable network 15, as well as recorded and otherwise time shifted. To this end, the tokens are incorporated into the content and the tokens may be detected by a set-top box 18 at a viewer's home. A viewer may select content associated with the token to cause a data packet that includes the token and the set-top box identification to be delivered over the backchannel to the cable head end 12 depicted in FIG. 1.

In particular, FIG. 1 depicts a system 10 that includes a cable head-end 12, a television set 14 displaying content including visual content 16 associated with the token, a set-top box 18, a remote control 20, a data collector 22, a computer 24 for accessing a portal 26 and an advertiser's website 28. FIG. 1 further shows a token registry 30 with a bidirectional communication path to the data collector 22.

The cable head end 12 delivers content over the cable network 15 to the viewer's television 14. As shown, the content may include visual data 16 that directs the viewer to respond. In FIG. 1, the visual data 16 is an icon that has text directing the viewer to "Click". Typically, the icon is a visual indicator that is coordinated with the other content being displayed on the television 14. For example, the other content may be an ad for a new model of car with an indicator that more information about the car model can be obtained by "clicking" now. This direction to "click now" will be interpreted by the viewer as an instruction to press the select button on the remote control 20.

As shown in the figure, the set top box 18 will detect the presence of the token-encoded content and, should the user choose to respond, a select command sent from the remote control 20 and in response will generate a data packet that may be transferred across the backchannel of the cable network 15 to the cable head end 12. If the token is assigned to a 30-second advertisement, the advertisement's Ad-ID, ISCI code or other ad asset identifier can also be associated with the token and carried in the data packet. The data packet will include whatever information the program running on the set top box 18 chooses to send, but in this embodiment, the packet will, among other things, include an indication that the user pressed the select command and some indication of what content prompted the viewer to press the select command and the unique set-top box identifier. An example of one data packet is set out in Table 1.

TABLE 1

| Component | Description |
|---|---|
| A unique consumer terminal device id | This may be the MAC address or it may be some other device id. |
| Token ID | The token id of this content |
| Device Type | Model type if it can be found |
| Low Sequence | First Token ID Sequence seen |
| Click Sequence | Token ID Sequence at click |
| Token Start Time | The clock time the token was first seen |
| Current Click Time | The clock time the token was clicked |
| Channel | The virtual channel number the terminal was tuned to |
| Channel Time | The time channel was original tuned by the terminal or consumer |
| Last Channel | The previous channel that the terminal was tuned to |
| Last Channel No surf | The previous channel that the terminal was tuned to that was not classed as surf (dwell time was greater than "Surf Time" |

The indication of the content will typically be a copy of the registered token, or at least some portion of that token, delivered with the content. This will be incorporated into the data packet transferred over the backchannel. As shown in FIG. 1, the cable head end 12 receives the data packet. A data process operating on a server at the cable head end 12 will handle the data packet. In this embodiment, the data process is operating on the data collector 22. When the cable head end receives the data packet over the cable 15, it can pass the data packet to the data process running on the data collector 22. The data process in this embodiment sends the data packet on to the media manager 48 which accesses the registry 30. The registry 30 will find the token data carried in the data packet and check if the token is valid. In this embodiment, the token registry 30 also delivers a link to a web site that the token owner has provided to the registry 30. The depicted media manager 48 generates the web page 24 that includes the Internet link provided by the token owner, which often is a link to content associated with the new car model. The web page 24 can be viewed by the user through a client 26 and interacting with the web page 24 can lead the client 26 to collect data from the web site 28, for example an auto maker's website for its national ad campaign for its new model cars. Accordingly, tokens built into the ad agency's content provide pointers that can link consumers to different sites on the Internet.

The system 10 controls and polices this link to the Internet by, in this embodiment, the set-top box verifying that the token and the content are a valid pair and by requiring verification from the registry 30 to place an authorized web link associated with the returned token in the consumer's personal consumer portal. The consumer is then able to log into their consumer portal 26 and access the linked web pages they requested while watching television. For example, during an Oprah book review, an embedded token could be linked to a web page about the book. While watching the book review on television the consumer clicks OK on their remote control. Later they log into their consumer portal where they find the link to the web page about the book. The consumer has the ability to set preferences within their consumer portal to indicate favorite retailers, enable single sign-on between the consumer portal and retailer sites, set email preferences and more. The consumer portal may be hosted by a third party such as the consumer's television provider (for example, Comcast), social networking web portals, news portals or other portals which can be set via a set up page on a TV, phone, or Internet device. The consumer can also move their primary portal to other portals by accessing consumer preferences either over the TV, telephone or Internet to move the token destination. In the event the consumer does not have a consumer portal, there will also be the option to set up over the telephone, via mail, or other means, a default email address to send all clicked content.

Figure 2:
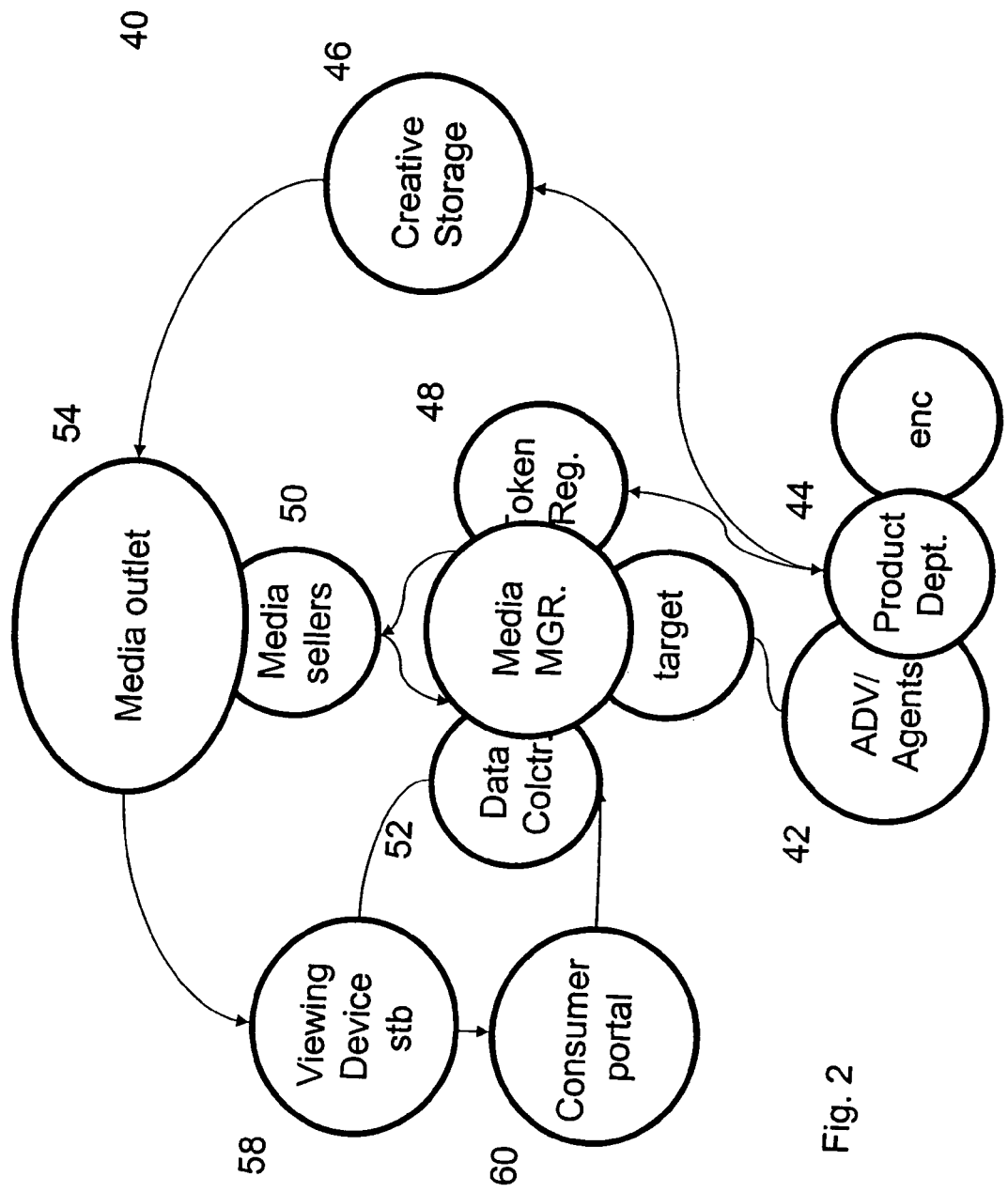
FIG. 2 depicts a flow chart diagram of one process for tracking content as it's delivered over a cable network.

FIG. 2 depicts a process flow diagram that illustrates how the system 10 uses the token encoded content 16 with the registry 30 to provide a media campaign that allows control of the Internet content that is linked to the television content 16. As will be seen through FIG. 2, the systems and methods described herein integrate into the media content production process a set of capabilities for extending the media content to include content on the Internet. Tokens are embedded within the digital media content meta data such that they exist within the content from the time of insertion, to the play out over the television airwaves, cable plant or satellites, to the consumer's set top box, to the playback of DVR-recorded content, to reruns of syndicated shows, to play out on other devices such as mobile telephone screens. Since tokens are unique, the token may remain valid as long as the token owner wishes, and as long as the content is in circulation. As will be described with reference to FIG. 2, a media manager will use the token registry 30 to allow the token owner to manage and control, over the lifetime of the media asset, the Internet content that is to be linked to that media asset.

In particular FIG. 2 illustrates one process for registering a token for deployment over the cable TV network and for integrating that token into the content developed for a broadcast advertising campaign. In particular, FIG. 2 depicts a process 40 that shows an example of how a token may be registered for use with the system 10. The process 40 starts in step 42 where an advertising agency is interested in developing interactive content for delivery over a network such as the network 15 shown in FIG. 1. The advertising agency develops the content, which in this embodiment in a media file of video content that can be played as a thirty second television ad. The agency accesses the token registry 30 in operation 44 and collects or purchases a token. The token has a unique ID that is recorded by the registry 30. The token creation and registration processes are designed to prevent tampering with a token, creating counterfeit tokens, or "hi-jacking" a token and embedding it into unauthorized content.

Figure 3:
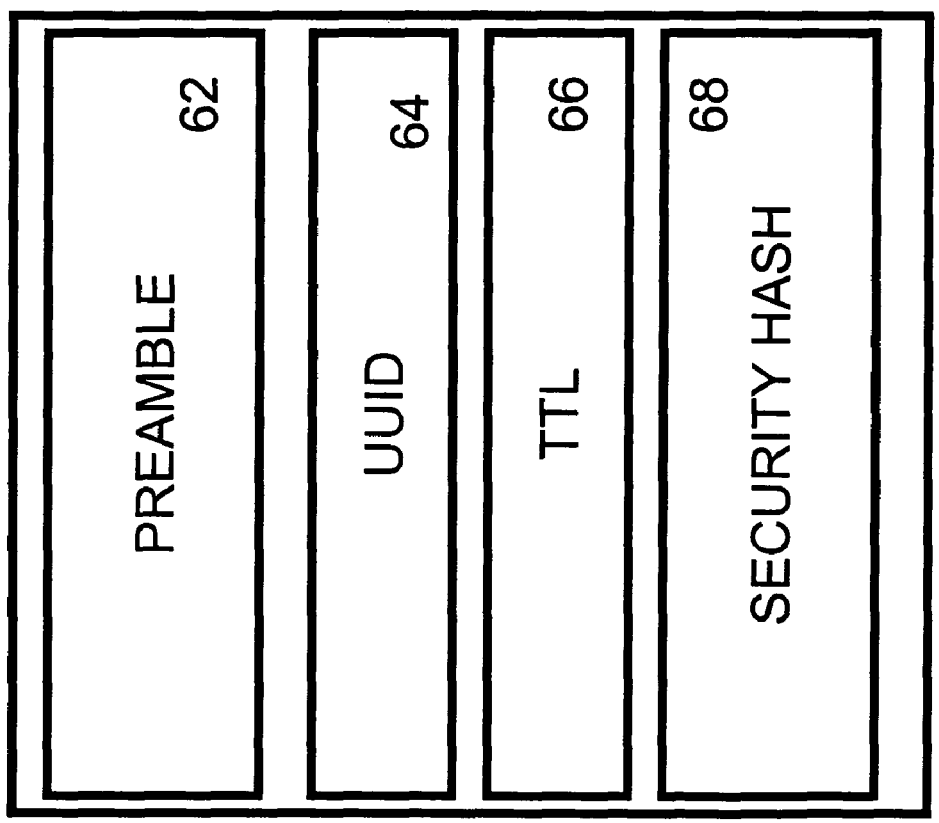
FIG. 3 depicts one example of a token.

FIG. 3 depicts one embodiment of a token. The composition of the depicted token 60 includes a preamble 62 that identifies the source of the token, a unique identifier 64, and a token security hash 68 to prevent tampering and counterfeiting. Each token 60 is registered and typically the registration rights only allow for the token to be embedded into specific content with parameters assigned to it by authorized parties. Optionally, the registration process may allow the owner to associate Internet content with the token and set rules for how the content is to be handled and controlled. The registry 30 may allow the token owner to use the token to grant the viewer direct access through the data collector 22 and on to the media manager 48. For example, the data packet sent over the backchannel may be directly forwarded through the media manager 48 to an Internet site to make purchases through an account earlier set up by the consumer. Optionally and alternatively, the registry 30 allows the token owner to establish a set of rules that set a time period during which the consumer may be transferred directly on to the Internet, and other time periods during which a link associated with the token is placed in the consumer's portal.

The unique identifier, in one embodiment may be a Universally Unique Identifier (UUID) (also known as a Globally Unique Identifier—GUID), generated according to protocols specified by the Internet Society, to ensure that every token 60 is unique.

The token 60 may also include separately or as part of the preamble 62, a block of private data that identifies additional information about the advertisement or content, or an operation to be performed. This section is typically reserved for commands relating to the behavior the set top box 18 will take upon detection of the respective token, for example to use a pre-loaded ad to play-out or display or to indicate an expiration date for the token (that is, the token should be ignored if recognized during delivery for a time-delayed personal video recorder file rather than a live broadcast). The private data block may include a flexible scripting language to enable token owners to embed commands for the set top box 18 into the token such as when to present the visual cue, where on the screen to place it, and for how long to play it.

Additionally and optionally the token 60 may include a checksum calculated from the preceding elements of the token, and used to ensure that the token 60 has been captured in full has internal integrity. A further optional feature is a time counter that indicates the current time within the duration of the content associated with token 60 that the set top box 18 is reading. This allows the set top box 18 to record when within the play out a consumer took an action. For example, the consumer tuned in at second 10 of 120, clicked to respond at second 102 of 120 and turned the TV off at second 118 of 120. Additionally the token 60 may have an optional time to live data field that indicates the time for which that token 60 is valid.

The token elements are created in two steps: One step is at the time of token purchase and registration and the second step is at the time of embedding the token into the content. In some cases these two steps may take place simultaneously such when the token is registered and embedded at the same time, and in other cases the token can be purchased in advance and embedded later. For example, a user of the media manager depicted in FIG. 2 can purchase tokens for later user use. The media manager application can also be set up to automatically make the token purchases they will need for their campaign as they define their campaign, media buys, and traffic assignments in the media manager. The majority of the token 60 is created in the first step including the preamble, the UUID, the private data, and portions of the security hash. The final portion of the security hash is created in the second step when the token is embedded into the content.

Optionally, a portion of the security hash 68 is based on the actual content (video and/or audio) the token is embedded into. Upon embedding the token 60 into a media asset (content), an encoding application "reads" portions of the content and appends a unique "hash" of that content into the token. The addition of the "hash" of the content to the token 60 acts to prevent the token 60 from being copied from one piece of content and embedded into other content. Techniques for generating hash codes based on contents of a data file are known in the art, including in Applied Cryptography, Second Edition, Bruce Schneier John Wiley & Sons, (1996). To increase security the token may be encrypted. An encryption key may be derived from a unique portion of the content file—typically an MPEG2 file—that the token 60 is encoded in. The key enables a device with the decryption algorithm, such as the set top box 18, to decrypt the token 60 provided that the token 60 and the correct content are present for the decryption. Without the correct content the token 60 cannot be decrypted and is thus invalid and harmless. Additional encryption may also be used to ensure secure delivery of tokens throughout the system. The token 60 may be encrypted and signed such that it can be authenticated by the token registry 30 in a similar fashion to certificates used in secure transactions.

Further optionally, the token may be appended during the encoding process to designate increments during each second of content duration. This enables the playout device to determine at what point in the token content an event took place. For example, an event log will capture whether a consumer tuned into token-encoded content in the middle of its playout or tuned away from that content before its playout concludes.

Now that the token 60 has been generated, the process 40 incorporates the token tightly with the media asset. Returning to FIG. 2, the registry 30 may, in step 48 have an encoding application that updates the token registry 30 with the newly created token 60, thus creating the final form of the token 60.

The token is encoded into the content created by the ad agency in step 44. Continuing with the example above, if the ad agency is creating a thirty second television spot the file created will eventually be an MPEG-2 file, as this is currently the format for the majority of transmissions over the cable network. The token may be encoded into the MPEG-2 file by accessing the Program Specific Information (PSI) in the MPEG-2 file. This information identifies what parts of the transport stream belong to a particular program. This information is carried in a number of PSI tables:

Program Association Table (PAT) (required)
Program Map Table (PMT) (required)
Conditional Access Table (CAT) (optional)
Network Information Table (NIT) (optional)

The Program Association Table (PAT) is the entry point for the Program Specific Information (PSI) tables. It is always carried in packets with PID (packet ID)=0. For each assigned program number, the PAT lists the PID for packets containing that program's PMT. The PMT lists all the PIDs for packets containing elements of a particular program (audio, video, aux data, and Program Clock Reference (PCR)). The PAT also contains the PIDs for the NIT(s). The NIT is an optional table that maps channel frequencies, transponder numbers, and other guide information for programs. The CAT is always carried in packets with PID=1. The CAT contains PIDs for Entitlement Management Messages (EMMs), which contain authorization level information for conditional access systems. Each set top box will include a an MPEG transport decoder that will read the PAT to find the PMT for a desired program, demultiplex the packets that carry the desired PMT, read the PMT, and demultiplex the packets (with PIDs specified in the PMT) into the various elemental streams.

Accordingly the PMT provides a table of entry points to the video and audio data that is integral to the MPEG-2 file.

The token encoder can, via PID (Packet Identifier) filtering, access the PMT to find pointers to the meta data block of the MPEG-2 file. The encoder can add the token information into the meta data for use by a set top box having a program for decoding the token data. This will place a token of the form depicted in FIG. 3 into the meta data blocks of the MPEG-2 file. Optionally the token data will include instructions for the set-top box to produce a graphic icon that will present itself to the viewer while the video file is playing for the user. Encoding may take place through a third party content creation tool such as Avid Xpress, Apple Final Cut Pro or other application.

The user can register the tokens at the same time they encode them within the content using the encoder application or plug-in to third party software.

As shown in FIG. 2, once the token 60 is encoded in step 44, the content may be stored in the storage 46. The process 40 includes a step of having a media outlet pull ads from the storage 46 to deliver to the media outlet 50. The advertising content pulled from storage 46 may be played out by the media outlet to the viewing devices 58, which typically have set top boxes. The set top boxes as described above will detect the embedded tokens and detect commands from the viewer to be linked to Internet content. The set top box 18 will deliver the data packet to the cable head end, where the data packet will be delivered to the media manager 48. The media manager accesses the token registry 30 to determine if the token is valid and then uses the data collector to determine information about the received request from the viewer.

Figure 4:
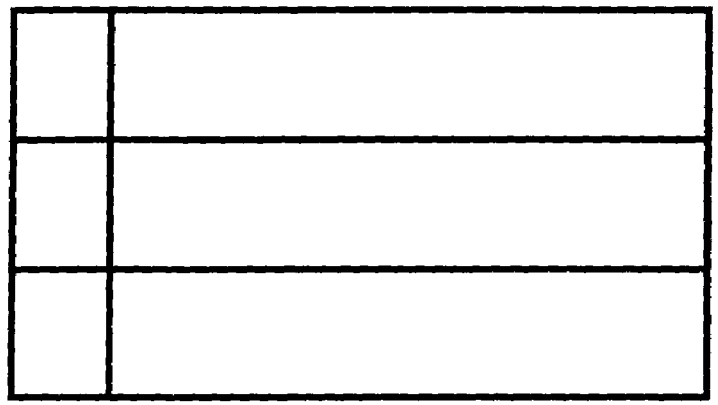
FIG. 4 depicts a functional block diagram of one embodiment of a registry.
Figure 4:
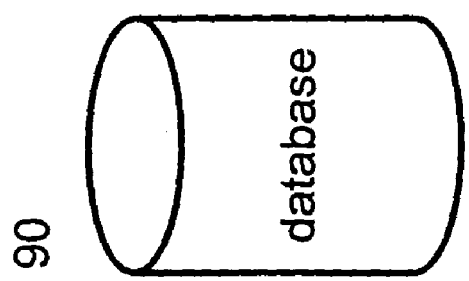
Figure 4:
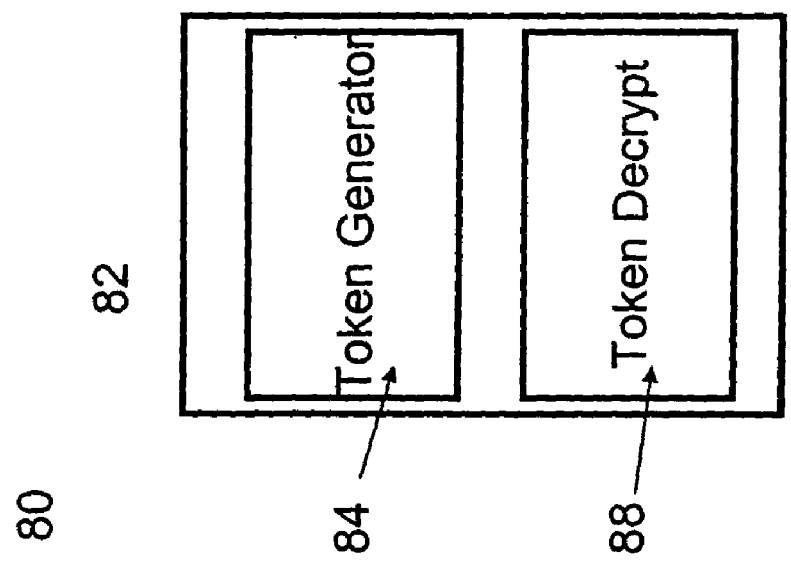

FIG. 4 illustrates a functional block diagram of one embodiment of a token registry 30 that may be accessed by the media manager 48 during operation of the process 40. The registry may be a computer program running on a data processing platform 82 and therefore being programmed to provide the registry apparatus described herein. The depicted data processing system can be a conventional data processing platform such as an IBM PC-compatible computer running the Windows operating systems, or a SUN workstation running a Unix operating system. Alternatively, the data processing system may comprise a dedicated processing system that includes an embedded programmable data processing system that includes the registry system. The registry 80 depicted in FIG. 4 includes a token generator process 84 that creates tokens as described above. The generated tokens may be given or sold, and once delivered, the token registry 80 can create an entry in the token database 90 that identifies the token ID as valid and known to the registry. Each token that is used on the system is centrally registered in the database 90.

The database 90 can have a data table 92 that is indexed by the unique token id given to each token. The data table 92 can store any number of fields having information that is to be associated with the token. For example, the data table 92 can store the Internet link that the token owner has associated with the token. The data table 92 may also maintain a field that indicates whether the token has been paid for, and if on a monthly payment plan, is currently in default. Optionally, the data table 92 may include a set of rules that can be associated with how the media manager will respond to data packet carrying the respective token. The token registry may allow the token owner to associate rules with each token. Rules can be static and rarely changing, for example, whether or not the token can be sold to an advertiser, what type of advertiser or product it can be sold to, whether a banner ad can be associated with it, the standard sizing of the banner ad, whether there can be an audio component to the banner ad, and more. Rules may also be dynamic which allows the actions associated with the token to change depending on various real-time circumstances of its play out including the channel number, time of day, television service provider, type of consumer play out device (TV set-top box, mobile device, etc.) or other variables that will be determined in the future. A user interface for assigning rules to token behavior may be provided through the media manager to the token owner, giving the owner control to configure the response to the token.

For example, the token owner may set rules for a token to allow for the targeting of advertising by household for specific advertisements based on recency. For example, if McDonald's owns a token embedded in a syndicated television show, they may set rules on the behavior of the token such that a breakfast sandwich banner ad appears if the token play out is in the morning and a burger banner ad displays if the token play out occurs at any other time. Content owners will be able be able to establish rules governing the sale of token links allowing cable companies as well as other distributors to sell the advertising link or content link based upon various rules such as time of day, cable company, DMA, or day of week. In this way the content owner can control the linked websites even if the token is sold to an advertiser.

The depicted database 90 can be any suitable database system, including the commercially available Microsoft Access database, and can be a local or distributed database system. The design and development of suitable database systems are described in McGovern et al., A Guide To Sybase and SQL Server, Addison-Wesley (1993). The database 90 can be supported by any suitable persistent data memory, such as a hard disk drive, RAID system, tape drive system, floppy diskette, or any other suitable system. The system depicted in FIG. 4 includes a database that is separate from the data processing platform, however, it will be understood by those of ordinary skill in the art that in other embodiments the database can be integrated into the overall system.

The token registry 80 also includes a decryptor process that can decrypt encoded tokens, or data within the tokens. To that end the table 92 may include encryption keys that can decrypt the data carried with the token. The decryptor may also verify that the token received is actually associated with content to which it is registered. For example, if PepsiCo creates a Fritos banner ad and registers and embeds a token into the banner ad, a user of the system would be able to authenticate the token within the ad using the decryptor. The decryptor "reads" the content data and compares it with the token. If a match is found, the user is assured that the token genuinely belongs to that content. If a match is not found then the token has been moved into other content by an unauthorized user and the token is known to be invalid.

The token registry may also monitor the connectivity of the web links of registered, valid tokens and alert token owners of dead links. This may be an extra subscription rate to the existing services so that embedded links within advertising can be maintained throughout the entire life cycle of the advertisement or campaign. A variety of reports and metrics can be produced by the token registry such as usage thresholds, rate of click-through, and comparison of views to clicks to information downloads to purchases. All the data relating to the life cycle of all the tokens is maintained and available for analysis by users within the permissions established for each user. In general, users will be able to access detailed data on their own campaigns, and aggregated (non-identifiable) data on other campaigns in the system.

Figure 5:
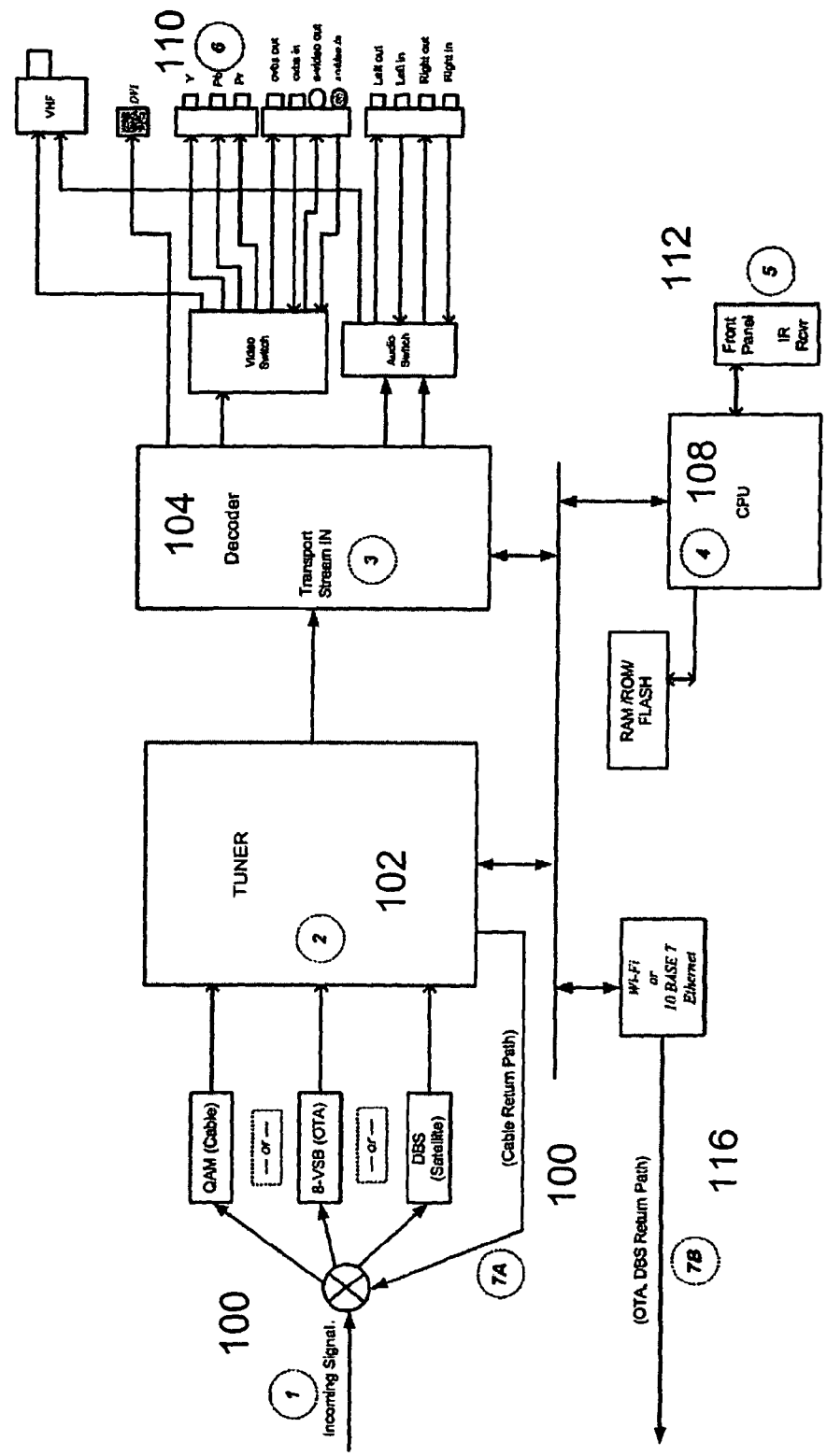
FIG. 5 depicts a functional block diagram of a set-top box.

FIG. 5 depicts, in more detail, that the cable, digital terrestrial broadcast, or direct broadcast satellite video MPEG-2 transport stream 100 is tuned 102 and decoded 104 by the set top box. The decoder parses the elementary data stream contained in the MPEG-2 transport stream and extracts the token specific data contained within the stream, via Packet ID filtering, as directed by the CPU 108. The CPU 108 produces the on-screen display (OSD) video character generation which is combined with the video and audio components of the decoded transport stream to produce a visible indicator (an "opt-in" icon) as an overlay display in the video out 110. The user, upon viewing the "opt-in" icon, may indicate an interest to bookmark the context of the token id via an IR remote, as received by the IR receiver 112. The software agent in running on the CPU creates a response message to a remote server that associates the user's interest with the specific token id and set-top box identification. This response message is sent via the backchannel "return path" (either 114 or 116) depending on network type (cable, digital terrestrial or direct broadcast satellite video).

As discussed above, the registry can be realized as a software component operating on a conventional data processing system such as a Unix workstation. In that embodiment, the registry can be implemented as a C language computer program, or a computer program written in any high level language including C++, FORTRAN, Java or Basic. Additionally, in an embodiment where microcontrollers or DSPs are employed, the registry can be realized as a computer program written in microcode or written in a high level language and compiled down to microcode that can be executed on the platform employed. The development of such systems is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, Programming in C, Hayden Publishing (1983). It is noted that DSPs are particularly suited for implementing signal processing functions, including preprocessing functions such as image enhancement through adjustments in contrast, edge definition and brightness. Developing code for the DSP and microcontroller systems follows from principles well known in the art.

Those skilled in the art will know or be able to ascertain using no more than routine experimentation, many equivalents to the embodiments and practices described herein. For example, the systems and methods described herein have discussed cable television systems, but these systems and methods may be applied to any television system that can have some kind of backchannel, such as a phone line return path. Additionally, the systems have discussed certain file formats, such as the MPEG format. However, these systems may be used with any suitable file format and any version of such formats. Accordingly, it will be understood that the invention is not to be limited to the embodiments disclosed herein, but is to be understood from the following claims, which are to be interpreted as broadly as allowed under the law.

We claim:

1. In a television network having a television distribution system and a backchannel communication path, a system for receiving a response from a consumer to content viewed by the consumer on a television and for providing an Internet-based deliverable to the consumer as a result of said response, comprising:
    a token registry configured to:
        generate a token including a unique identifier;
        register the token to a token owner, wherein registering the token includes storing the unique identifier;
        associate television content with the token; and
        store, in association with the token, data identifying at least one Internet-based deliverable to be delivered to a consumer via the Internet when the consumer interacts with the token;
    a token encoder in communication with the token registry, the token encoder configured to insert the token into the television content at multiple times over the duration of the television content for delivery over a television distribution system in a television network, wherein each instance of the token inserted into the television content is accompanied by data identifying a temporal location of that instance of the token within the television content;
    a video receiving device associated with the consumer configured to:
        detect the tokens encoded within the television content being received by the device over the television distribution system; and
        generate, in response to a command signal received from a consumer controller during display of the television content, a consumer response data signal to be transmitted over a backchannel communication path in the television network, the consumer response data signal comprising a request for delivery of the Internet-based deliverable to the consumer over the Internet and data indicative of the temporal location of the token that was last received by the video receiving device before receipt of the command signal from the consumer;
    a data collector, coupled to the video receiving device via the backchannel communication path and to the token registry, configured to receive the consumer response data signal, and to forward the signal to the token registry; and
    a consumer portal in communication with the token registry configured to provide the at least one Internet-based deliverable associated with the token-encoded television content to the consumer over the Internet subsequent to receipt of the consumer response data signal by the token registry; wherein
    the token registry is further configured to provide the token owner with data indicative of consumer response activity to the token registered to the token owner based at least in part on the consumer response data signal, wherein the data indicative of the consumer response activity comprises data indicative of the temporal location of the token that was last received by the video receiving device before receipt of the command signal from the consumer.

2. The system of claim 1, wherein the Internet-based deliverable associated with the token in the token registry is a link representative of a pointer to a website.

3. The system of claim 1, wherein the token registry stores data regarding a visual indicator associated with the respective token that is simultaneously displayed with the token-encoded television content.

4. The system of claim 1, wherein the video receiving device, upon detecting the presence of the token, is configured to generate, for simultaneous display with the television content to the consumer, a visual indicator to the consumer indicative that the at least one Internet-based deliverable is available for delivery to the consumer over the Internet.

5. The system of claim 1, wherein the token encoder inserts the token multiple times within the content at a selected periodic rate.

6. The system of claim 1, wherein the token encoder includes a time stamp for time stamping the occurrence of the token within the content.

7. The system of claim 1, wherein the token encoder communicates token insertion data to the token registry.

8. The system of claim 1, wherein the token registry includes a rules engine for allowing the token owner to define rules for providing the Internet-based deliverable associated with the token to a consumer who interacts with the token, wherein said rules are dependent on at least one of a consumer demographic, a date range, a time of day, and a campaign goal.

9. The system of claim 1, further including an outlet site for allowing the token owner to purchase or sell tokens to another business user.

10. The system of claim 1, wherein the television content is a television commercial.

11. The system of claim 1, further comprising a plurality of video receiving devices, each video receiving device being associated with a given, different consumer, wherein each of said video receiving devices is configured to:
- detect the tokens encoded within the television content being received by the device over the television distribution system;
- generate, for simultaneous display with the television content to the given consumer, a visual indicator to the consumer indicative that the at least one Internet-based deliverable is available for delivery to the consumer over the Internet; and
- generate, in response to a command signal received from a consumer controller during display of the television content, a consumer response data signal to be transmitted over a backchannel communication path in the television network, the consumer response data signal comprising a request for delivery of the Internet-based deliverable to the given consumer over the Internet and data indicative of the temporal location of the token that was last received by the video receiving device before receipt of the command signal from the given consumer.

12. They system of claim 11, wherein said token registry is configured to provide the token owner with data indicative of consumer response activity from the multiple, different consumers to the token registered to the token owner based at least in part on the consumer response data signals, wherein the data indicative of the consumer response activity comprises data indicative of the temporal locations of the tokens that were last received by the video receiving devices before receipt of the command signals from the multiple consumers.

13. A method for receiving a response from a consumer to content viewed by the consumer on a television and for providing an Internet-based deliverable to the consumer as a result of said response, comprising:
- generating with a token registry a token including a unique identifier;
- registering the token to a token owner with the token registry, wherein registering the token includes storing the unique identifier;
- associating television content with the token with the token registry;
- storing, with the token registry in association with the token, data identifying at least one Internet-based deliverable to be delivered to a consumer via the Internet when the consumer interacts with the token;
- inserting, with a token encoder in communication with the token registry, the token into the television content at multiple times over the duration of the television content for delivery over a television distribution system in a television network, wherein each instance of the token inserted into the television content is accompanied by data identifying a temporal location of that instance of the token within the television content;
- detecting, with the video receiving device associated with the consumer, the tokens encoded within the television content being received by the device over the television distribution system;
- generating, with the video receiving device in response to a command signal received from a consumer controller during display of the television content to the consumer, a consumer response data signal to be transmitted over a backchannel communication path in the television network, the consumer response data signal comprising a request for delivery of the Internet-based deliverable to the consumer over the Internet and data indicative of the temporal location of the token that was last received by the video receiving device before receipt of the command signal from the consumer;
- receiving the consumer response data signal with a data collector that is coupled to the video receiving device via the backchannel communication path and to the token registry;
- forwarding the consumer response data signal to the token registry with the data collector;
- providing, with a consumer portal in communication with the token registry, the at least one Internet-based deliverable associated with the token-encoded television content to the consumer over the Internet subsequent to receipt of the consumer response data signal by the token registry; and
- providing, with the token registry, the token owner with data indicative of consumer response activity to the token registered to the token owner based at least in part on the consumer response data signal, wherein the data indicative of the consumer response activity comprises data indicative of the temporal location of the token that was last received by the video receiving device before receipt of the command signal from the consumer.

14. The method of claim 13, further comprising generating, with the video receiving device for simultaneous display with the television content to the consumer, a visual indicator to the consumer indicative that an Internet-based deliverable is available for delivery to the consumer over the Internet.

15. In a television network having a television distribution system and a backchannel communication path, a system for receiving a response from a consumer to content viewed by the consumer on a television and for providing an Internet-based deliverable to the consumer as a result of said response, comprising:
- means for generating a token including a unique identifier;
- means for registering the token to a token owner, wherein registering the token includes storing the unique identifier;
- means for associating television content with the token;
- means for storing, in association with the token, data identifying at least one Internet-based deliverable to be delivered to a consumer via the Internet when the consumer interacts with the token;
- means for inserting the token into the television content at multiple times over the duration of the television content for delivery over a television distribution system in a television network, wherein each instance of the token inserted into the television content is accompanied by data identifying a temporal location of that instance of the token within the television content;
- means for detecting the tokens encoded within the television content being received by the device over the television distribution system;
- means for generating, in response to a command signal received from a consumer controller during display of the television content to the consumer, a consumer response data signal to be transmitted over a backchannel communication path in the television network, the consumer response data signal comprising a request for delivery of the Internet-based deliverable to the consumer over the Internet and data indicative of the temporal location of the token that was last received by the video receiving device before receipt of the command signal from the consumer;
- means for receiving the consumer response data signal;

means for providing the at least one Internet-based deliverable associated with the token-encoded television content to the consumer over the Internet subsequent to receipt of the consumer response data signal; and means for providing the token owner with data indicative of consumer response activity to the token registered to the token owner based at least in part on the consumer response data signal, wherein the data indicative of the consumer response activity comprises data indicative of the temporal location of the token that was last received by the video receiving device before receipt of the command signal from the consumer.

16. The system of claim 15, further comprising means for generating, for simultaneous display with the television content to the consumer, a visual indicator to the consumer indicative that an Internet-based deliverable is available for delivery to the consumer over the Internet.

* * * * *